(No Model.) 2 Sheets—Sheet 1.
T. W. MORAN.
COMBINATION COUPLING FOR STEAM PIPES OF RAILWAY CARS.
No. 501,465. Patented July 11, 1893.
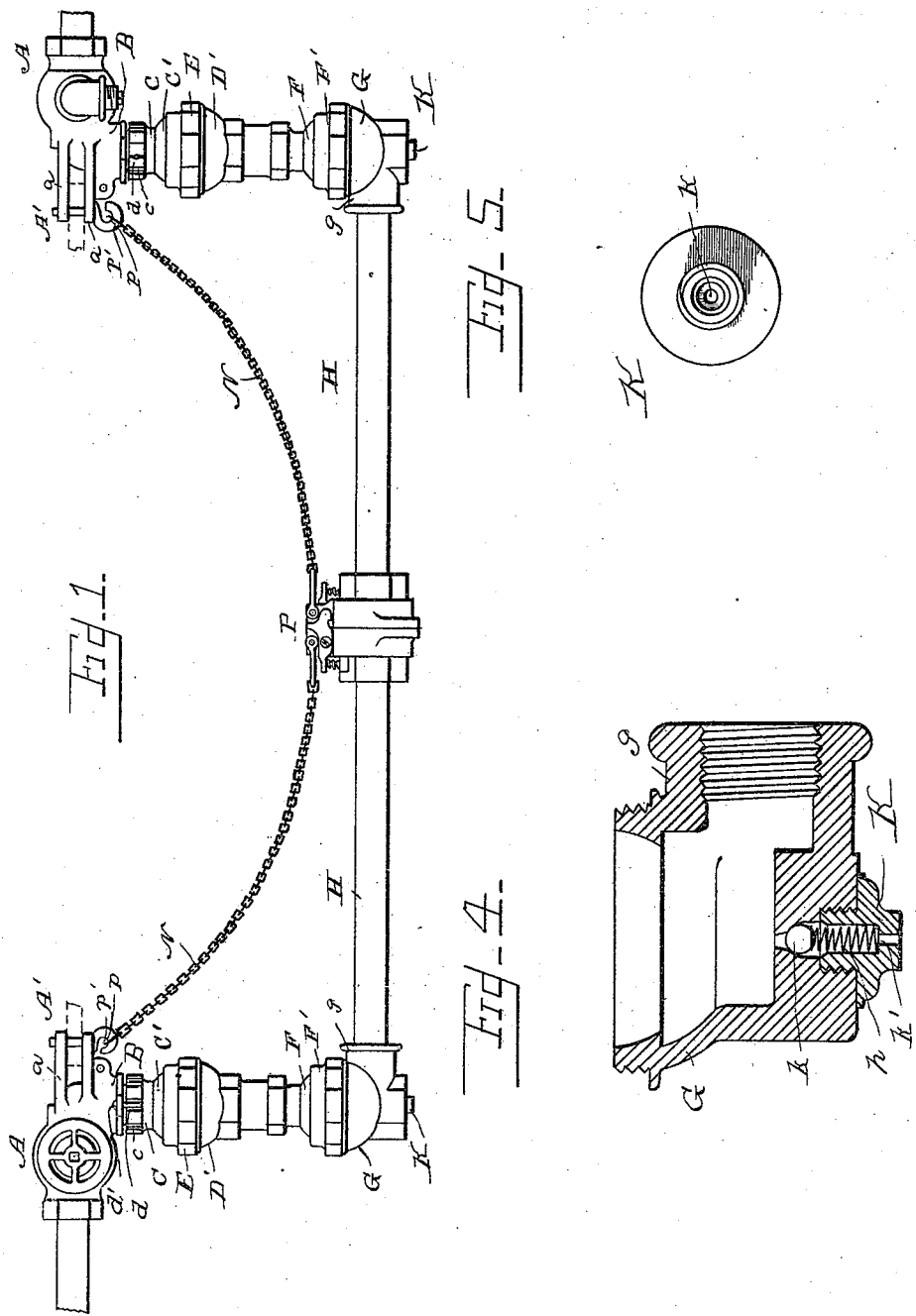
Witnesses
Jesse Haller
Philip C. Masi
Inventor
Thomas W. Moran
by E. W. Anderson
his Attorney

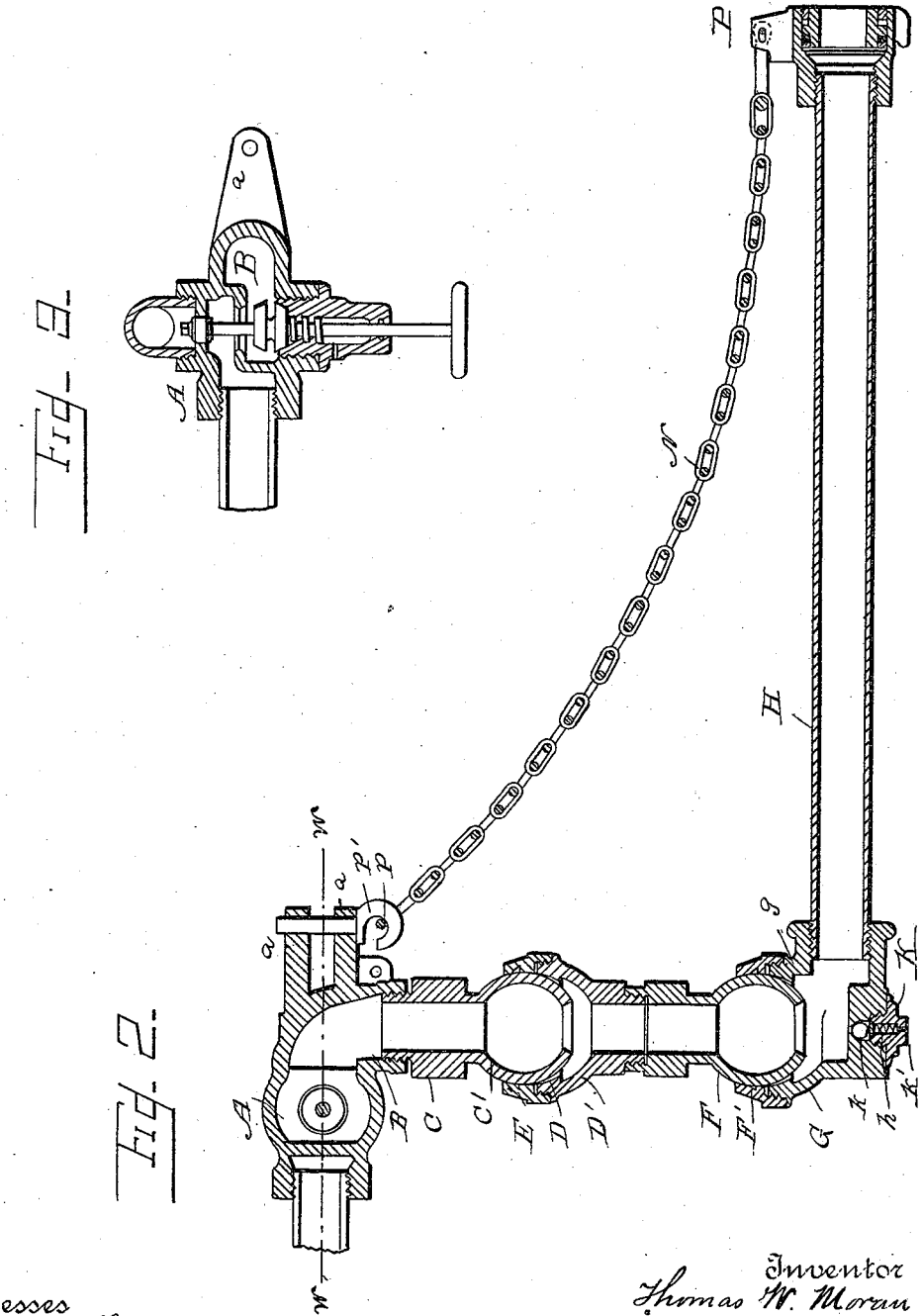

UNITED STATES PATENT OFFICE.

THOMAS WILLIAM MORAN, OF LOUISVILLE, KENTUCKY, ASSIGNOR TO THE MORAN FLEXIBLE STEAM JOINT COMPANY, OF SAME PLACE.

COMBINATION COUPLING FOR STEAM-PIPES OF RAILWAY-CARS.

SPECIFICATION forming part of Letters Patent No. 501,465, dated July 11, 1893.

Application filed November 26, 1892. Serial No. 453,246. (No model.) Patented in England January 4, 1892, No. 151; in France January 14, 1892, No. 218,675; in Belgium January 14, 1892, No. 97,925, and in Germany January 14, 1892, No. 65,277.

*To all whom it may concern:*

Be it known that I, THOMAS WILLIAM MORAN, a citizen of the United States, and a resident of Louisville, in the county of Jefferson and State of Kentucky, have invented certain new and useful Improvements in Coupling Apparatus for Steam-Pipes of Railway-Cars, (for which I have obtained patents as follows: in Great Britain, No. 151, dated January 4, 1892; in France, No. 218,675, dated January 14, 1892; in Belgium, No. 97,925, dated January 14, 1892, and in Germany, No. 65,277, dated January 14, 1892;) and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation of the coupling. Fig. 2 is a vertical longitudinal sectional view of one section. Fig. 3 is a horizontal section on line *w w* Fig. 2. Fig 4 is an enlarged view in section of the elbow joint, and Fig. 5 is a plan view in detail of the trap.

This invention has relation to a system of couplings for steam heating pipes of railway cars, and it consists in the novel construction and combination of parts as hereinafter specified.

In carrying out my invention, I provide the ends of the train pipe of each car with a relief valve A, secured to the car frame by means of a brace or bracket A′ secured between arms *a, a,* on the relief valve casing. This relief valve is preferably of the construction fully described and claimed by me in an application filed by me November 26, 1892, Serial No. 453,245.

In a downwardly projecting elbow B of each relief valve casing I connect the screw-threaded upper end of a pipe section C, on the lower end of which is a hollow ball or sphere C′ working loosely in a socket D on the upper end of a section D′ and held by an annular ring E having an inner spherically beveled surface fitting said ball section steam tight, and having an internal screw-threaded connection with said socket section. Said socket section also has a spherically beveled interior portion fitting the ball section steam tight, the parts being so arranged as to permit a universal movement, and yet maintain a perfectly steam tight joint under steam or vacuum pressure.

The upper section of the ball carrying section C has a wrench seat *c,* in which is formed a series of vertical grooves, or a series of projections *d* which are engaged by pins or bolts *d'* carried by the elbow portion B, thereby preventing the parts from unscrewing. The lower end of the section D′ carries a hollow ball or sphere F, similar to the ball C′ of the section C, and which has a universal movement in a socket and ring F′, similar to the socket D and ring E above described. This socket F is formed in the upper end of an angle or elbow joint G, having a threaded socket *g* at the opposite end to receive the end of the horizontal pipe section H.

In the lower or angular portion of the joint G is a small trap K. This trap comprises the ball *k* serving as a valve, closing the opening *k',* when pressure is in the pipes. When however the pressure is cut off, the ball is lifted from its seat by the action of a spring *h,* thus permitting the escape of the water of condensation through the aperture *k'.* It will be understood that each car is provided with the arrangement above described, the horizontal pipe sections of any two cars H, at their meeting ends, having each a coupling P. This coupling is preferably the piston coupling described and claimed by me in my application, filed November 26, 1892, Serial No. 453,244. To the latch of each coupling of this section is connected one end of a slack or tripping chain N, the opposite ends of which are connected to the respective relief valve casings. This connection may be made with an eye *p* on the lower end of the pin or bolt *p'* which secures the bracket or brace A′ to the relief valve. The coupling P should be located directly under the coupling of the cars. By the combination of parts as above described, a flexible coupling between cars is provided, which will adapt itself to all positions of the cars, and the various joints of which are perfectly steam tight under pressure, but which will permit the escape of all water of condensation when the pressure is off. By the provision of the relief valves, unnecessary pressure in the pipes is prevented when the valves are closed. Said relief valves may be provided with a secondary joint or elbow, by the provision of which it is possible to effect a coupling with a car fitted with a different style of coupling, as described in the application, Serial No. 453,245, above referred to.

The arrangement of the slack or tripping chains shown, renders the uncoupling entirely automatic.

Having described this invention, what I claim as new, and desire to secure by Letters Patent, is—

1. The herein described coupling for steam pipes between adjacent railway cars, said coupling comprising a relief valve A, connected to the train pipe of each car, vertical pipe sections C connected at their upper ends one to each of said relief valves, a hollow spherical ball C' on the lower portion of each of said sections C, the vertical sections D', having spherical sockets D in which said balls C' have universal bearings, the annular rings E securing said balls in said sockets, a hollow ball or sphere in the lower portion of each of said sections D', the angular sections G having a socket and ring F' in which works the ball F, the horizontal pipe section H connected at one end to the horizontal arms of the respective sections G, and the couplings on the meeting ends of said pipe sections H, substantially as specified.

2. The herein described coupling for steam pipes between railway cars, said coupling comprising a relief valve A connected to the train pipe of each car, the vertical pipe sections C having each a threaded connection at its upper end with one of said relief valves, a hollow spherical ball C' on the lower end of each section C, the vertical sections D' having spherical sockets D in which said balls C' have loose bearings, the annular rings E securing said balls in said sockets, a hollow ball or sphere F on the lower end of each section D', the angular sections G having a socket and ring F' in which works the ball F, the traps in said angular sections, the horizontal pipe sections H connected at one end to the respective sections G, the interlocking couplings on the meeting ends of said sections H, and the tripping chains for said coupling, substantially as specified.

In testimony whereof I affix my signature in presence of two witnesses.

THOS. WILLIAM MORAN.

Witnesses:
C. Q. MARTIN,
ORTON T. MORAN.